April 5, 1960
G. T. RANDOL
2,931,180
POWER-ASSISTED OPERATING MECHANISM FOR
HYDRAULIC PRESSURE SYSTEMS
Filed May 27, 1954
2 Sheets-Sheet 1
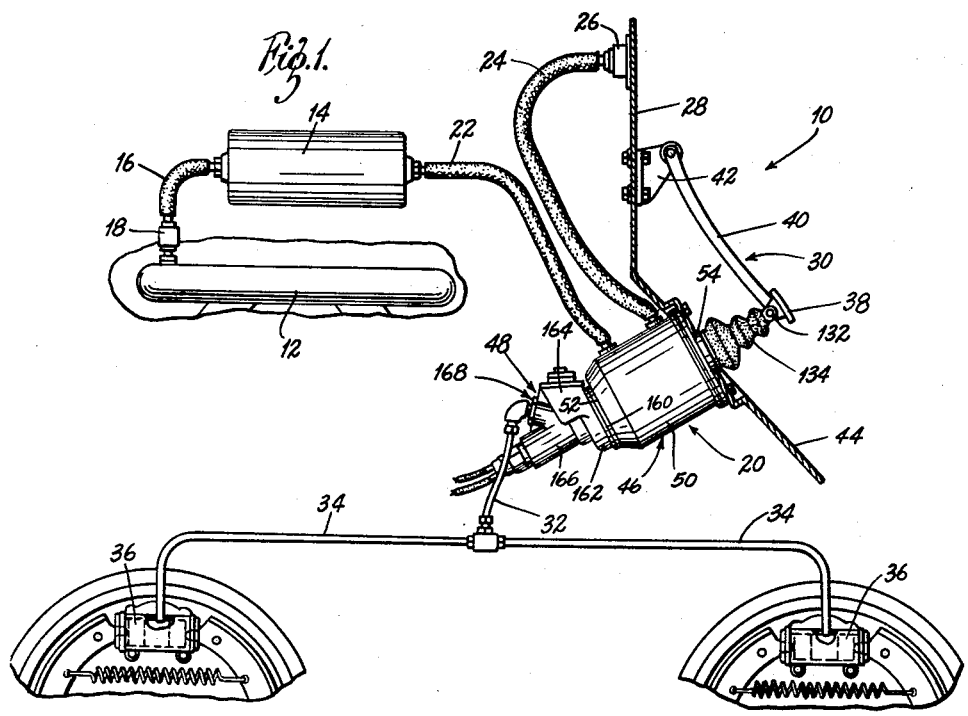
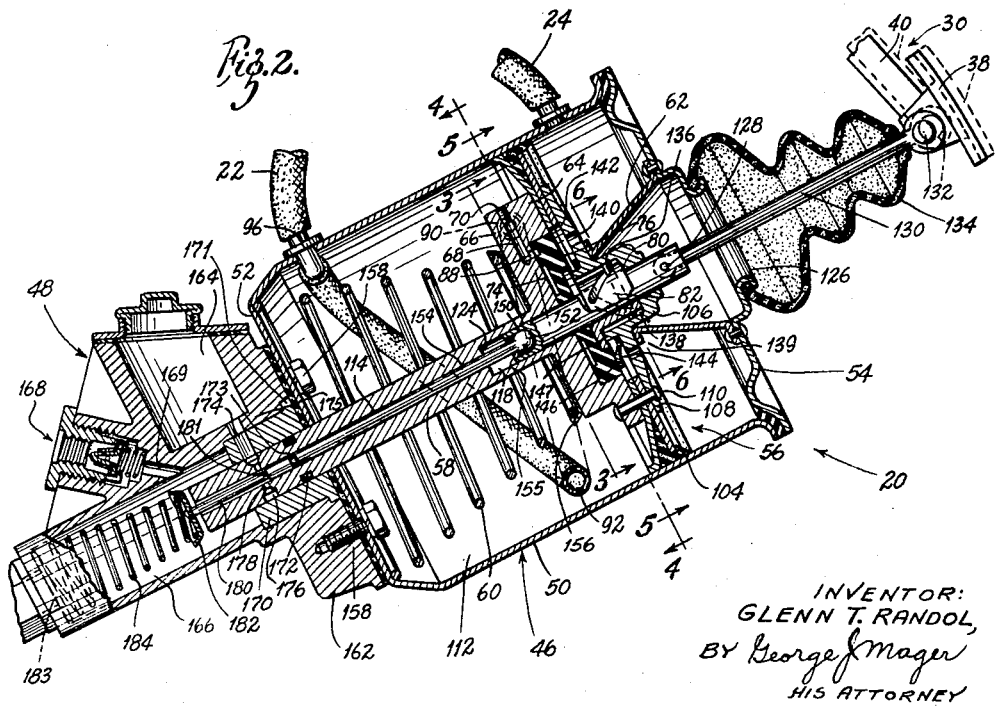
INVENTOR:
GLENN T. RANDOL,
BY George J Mager
HIS ATTORNEY

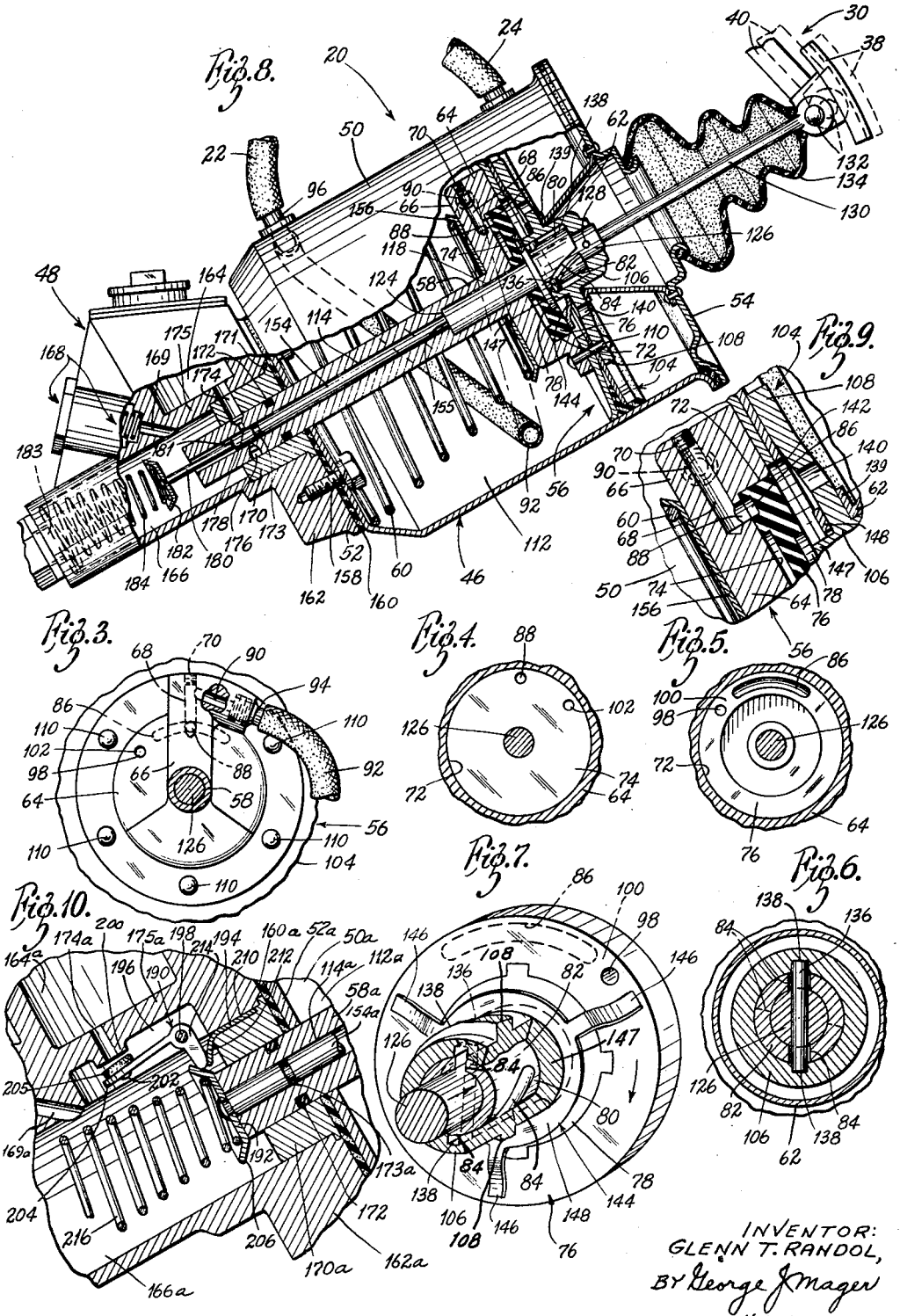

United States Patent Office 2,931,180
Patented Apr. 5, 1960

2,931,180
POWER-ASSISTED OPERATING MECHANISM FOR HYDRAULIC PRESSURE SYSTEMS

Glenn T. Randol, Mountain Lake Park, Md., assignor of fifty percent to Hamill-Markus Industries, Inc., Warren, Mich.

Application May 27, 1954, Serial No. 432,731

9 Claims. (Cl. 60—54.6)

The present invention relates to improvements in power-assisted actuators, i.e. pressure producing devices in which physical operating force is supplemented by power assistance. The improved actuator has been devised primarily for use in automotive vehicle brake systems, although it obviously has other applications of utility. The invention is related to and associated with servo-actuators or motors of the general character disclosed in U.S. Patent No. 2,770,949 granted to me November 20, 1956.

A primary objective of my invention is to provide a new and novel rotary-type control valve having included spring thrust reaction on an operator-operated member disclosed herein as a treadle for transmitting a progressively increasing reacting force on an element mechanically acted on directly by the treadle during power-boost, said element being adapted to also receive hydraulic thrust to oppose movement thereof by the treadle during operation of the liquid pressure producing mechanism whereby a measure of the total braking force reacts on said treadle.

More particularly, the present invention relates to improvements in personal and power-operated hydraulic brake operating mechanisms of the character referred to, said improvements including a more efficient and safety-conducive construction in that novel combined spring and hydraulic means are incorporated therein for automatically transmitting directly to the treadle, and consequently to the operator, instinctively predictable reaction that is of less magnitude than the concurrent hydraulic brake applying pressure at all treadle positions.

Another object of my invention is directed to the provision of a novel vacuum and/or air-operated power device or servomotor that is actuatable in response to treadle movements for selectively controlling in part the degree of brake applying pressures at the will and discretion of the vehicle operator, said device including means inherently adapted to convey to said operator an awareness of the existent braking force being applied. That is to say, the invention contemplates novel mechanism for transmitting what is known as "feel" of the brake control to the operator.

Therefore, another object of the invention is to provide in a hydraulic brake system of the type under consideration, novel means adapted to communicate to the operator reduced reactive pressures of the brake control being engendered in consequence of his activation of the vehicle brake pedal.

Another object is to provide in a hydraulic brake system of the type under consideration, novel means controllable by an operator-operated member adapted to transmit to the operator via said member, a realization of the degree of braking force existent in response to movements of the member, said means comprising spring action characterized by increasing tension progressively induced by the operator member operated from a normal released position wherein said spring assumes a normal pre-energized status, supplemented by direct and proportional reactive pressure forces on the operator member from the hydraulic master cylinder of said mechanism.

Another object of the invention, is to provide a secondary plunger or piston that is slidable in a primary plunger or piston which are operably projectable relatively and in unison into the hydraulic master cylinder aforesaid to pressurize the fluid therein, and to provide a pre-energized compression spring operably disposed between a wall of said cylinder and the end of the secondary plunger exposed to the hydraulic thrust within the master cylinder, whereby to enable the establishment of variable direct pressure reactions, and the automatic transmittal of them to the operator via the vehicle brake pedal, thus giving to the operator the desired "feel" control of the power braking effect.

Another important object of the present invention is the provision in power-brake mechanisms of the type under consideration, of a single normally preloaded helical spring capable of producing reactive force on the operating pedal substantially proportional to the degree of fluid pressure force required in applying the brakes according to the effective working stroke of the hydraulic actuator, and further serving to bias the movable power assembly including its control valve element to release the brakes in response to releasing the pedal to brake "off" position, and wherein an auxiliary preloaded spring devoid of reaction on the pedal may be employed to cooperate with the helical reactive spring in releasing the brakes as aforesaid.

A further novel feature related to the two objects next above residing in the operation aforesaid of the reactive spring, enables operative energization of the movable power assembly to apply the brakes free of the biasing action of said reactive spring whereby power-loss is reduced to a minimum.

A further object related to the three objects next above is to operably associate with said reactive spring in a novel and cooperant manner, a reactive element constantly subjected to fluid pressures within the hydraulic working chamber for communicating to the operator via the operating treadle a "feel" of braking force proportional to the effective line pressure when the brakes are "on," and wherein said element additionally serves to control the compensating fluid passage between the fluid reservoir and pressure producing chamber aforesaid.

It is also an object of this invention to associate novel power-operating mechanism, for example a vacuum-operated servomotor, with the conventional hydraulic master cylinder of present day automotive vehicles, whereby the brakes may be controlled responsive to incremental pedal movements with minimum operator effort, whereas hard braking applications may be effected in response to increased pressure on the brake pedal for quick stops in cooperation with the energized status of the power-operated mechanism. Such high pressure brake applications may be effected by direct force applied by the operator via the pedal without disabling power assistance provided by the energized power-operated mechanism. In the event the power-operated mechanism should become inoperative in consequence of engine stoppage with resultant loss of vacuum production, the operator may actuate the brake pedal in usual fashion to cause the hydraulic master cylinder to activate the brakes independently of said power-operated mechanism.

It is a further object of the invention to provide a novel power-operated mechanism of simplified construction that may be associated with conventional hydraulic pedal-operable master cylinders. In other words: the novel construction and operation of the movable power assembly of the present brake operating mechanism; the hydraulic actuator or plunger structure supported from said power assembly and projectable into the pressure working chamber of such master cylinders for controlling a compensating valve whereby to establish or close off fluid communication between the reservoir and said working chamber of the master cylinder; a reactive spring operably disposed between the head end of the plunger structure and the end wall of said cylinder; a novel rotatable air-vacuum control valve and other structure as will appear, cooperate to provide an assembly that may be readily applied to a conventional master cylinder of an automotive vehicle brake system.

Thus, it is a salient feature of the present invention to provide a new and improved brake booster unit that it adapted for field installation as an "after-market" accessory; a unit that would not require any alterations of the vehicle to accommodate such an installation; that would not require any special tools or particular skills to effect such an installation; a unit that will require only a minimum amount of maintenance to assure maximum operational efficiency.

The presently disclosed operating mechanism for a hydraulic brake system provides easy, safe, and positive braking control of the vehicle under all possible operating conditions, without sacrificing the normal operator effort on the brake pedal when and if the engine stalls. It is noted that in present-day brake systems, pedal travel has been reduced to such an extent that in the event the vehicle engine stalls, the operator is forced to rely upon his own foot power, as is understood. Were such a situation to develop with the vehicle on a grade, it should be apparent that a safety-jeopardizing condition would exist wherein operator effort alone could result in failure to bring the vehicle to a stop. It is therefore, an object of the present invention to utilize substantially the pedal travel normal to operating a conventional hydraulic master cylinder, but with the novel power operation applied as aforesaid, pedal travel for substantially all braking operations may be effected under all driving conditions by incremental pedal movements through the first portion of pedal range operation.

Other salient features and advantages provided by the invention will be noted in the course of the detailed description thereof to follow with reference to the drawings that accompany this specification. A more comprehensive understanding of the invention may further be had from the explanation of its operation that will follow the detailed description aforesaid.

In the drawings:

Figure 1 is a generally schematic presentation of a conventional hydraulic braking system for automotive vehicles and the like incorporating the novel liquid pressure producing mechanism comprising the instant invention, said mechanism being shown in fully released condition wherein the vehicle brakes are "off";

Figure 2 is a longitudinal sectional view on an enlarged scale of the mechanism per se of Figure 1, and showing the pedal-actuated parts initially moved relatively with respect to the power-actuated parts in a brake-applying direction;

Figures 3, 4 and 5 are elevational views partly in section, taken respectively along the lines 3—3, 4—4, and 5—5 of Figure 2;

Figure 6 is a sectional view on an enlarged scale taken along the line 6—6 of Figure 2;

Figure 7 is a perspective view on an enlarged scale and partly in section, portraying the rotary valve disk and elements closely associated therewith for controlling the booster mechanism;

Figure 8 is a view similar to Figure 2, demonstrating the momentary status that the mechanism of the invention would exhibit at the instant the rotary air-vacuum control valve attains its fully open position with the pedal poised to directly apply the brakes by operator effort if required;

Figure 9 is a reproduction, on an enlarged scale, of a portion of Figure 8; and

Figure 10 is a fragmentary sectional view on an enlarged scale, illustrating a novel modified valve arrangement for controlling fluid communication between a hydraulic pressure-producing chamber and its associated compensating fluid reservoir.

Referring to the drawings:

An exemplary hydraulic brake system for an automotive vehicle is schematically portrayed in Figure 1, and is designated in its entirety by the numeral 10. The illustrated system includes a vehicle engine intake-manifold 12; a reserve vacuum tank 14; a conduit connection 16 between the manifold and said tank; a check-valve 18; the hydraulic brake operating mechanism comprising the present invention and designated as a whole by the numeral 20; a first conduit 22 leading to the mechanism 20 from the vacuum tank 14; a second conduit 24 leading to said mechanism 20 from an air filter device 26 that is mounted on the vehicle firewall 28; a pedal-operable linkage mounted on the firewall in the driver's compartment and generally indicated at 30; and a third conduit 32 leading from the mechanism 20, and via its associated branch lines 34, to the brake cylinders 36 of the vehicle wheels.

Except for the novel construction and operation of the mechanism 20, the system illustrated and thus far described is well known. The check-valve 18 serves to maintain uniform vacuum conditions in the system irrespective of pressure changes within the manifold during engine operations, and further provides for the utilization of stored vacuum for limited braking applications subsequent to the cessation of engine operations.

The linkage 30 includes a treadle 38 integral with the lower end of a link 40, the upper end of said link being pivotally mounted in a bracket 42 that is secured to the firewall 28 in the driver's compartment. The mechanism 20 is supported from the underside of the operator compartment toe-board section 44, and includes in assembly: a vacuum booster unit generally designated 46, and a hydraulic pressure-producing unit or master cylinder similarly designated 48.

As best demonstrated in Figure 2, the vacuum unit 46 includes a cylinder 50 having an integral end wall 52; a cover plate 54 for the other end of said cylinder; a pressure-responsive piston assembly 56 which is reciprocable in cylinder 50; an axially bored pressure-transmitting or working member disclosed herein as a hollow plunger 58 rigid with the piston assembly, the free end portion of said plunger extending centrally through the wall 52 of the cylinder; a conical return spring 60 disposed about the plunger 58 between the piston assembly and the wall 52 of the cylinder; a flared or conically contoured stop member 62 rigidly supported in cylinder 50 from the cover plate 54; and other associated parts and related elements, as will appear. In the description to follow, the hollow plunger 58 will also be termed a power-actuated or primary plunger.

At its connected end, the power-actuated plunger 58 merges into a circular segment designated 64 that is included in the piston assembly 56, and will hereinafter be termed a "valve housing." With particular reference also to Figure 3, the valve housing 64 is provided with a boss portion 66 wherein is drilled a radial passageway 68, the upper end of said passageway being sealed by a threaded plug 70. A circular cavity 72 is provided in the housing 64, the bottom of said cavity being defined by a smooth finished surface 74.

Numeral 76 designates a valve element or rotor of the disk type that is seated for rotation in the cavity 72. This valve rotor is preferably fabricated of hard rubber or fibre as shown, or other similar material, and is provided with a smooth finished undersurface in intimate engagement with the finished surface 74 of cavity 72.

Embedded in and permanently bonded to the valve rotor 76 is the outstanding flange 78 of a tubular member 80, the cylindrical wall 82 of which has formed therein a pair of opposed spirally generated longitudinal slots 84. As best seen in Figure 5, the undersurface of the valve rotor 76 has formed therein an arcuate depression or concavity 86, also portrayed by broken lines in Figures 3 and 7. As will appear, the concavity 86 is in constant communication with a port 88 leading from the bottom surface 74 of the housing 64 to the drilled and plugged end passageway 68.

Numeral 90 designates a passage drilled angularly in the boss portion 66 as shown in Figure 3. A flexible hose 92 encircles the return spring 60 with adequate clearance, and communicates at one end with the passage 90 through the medium of a suitable fitting 94. The other end of said hose is in fluid communication via a suitable fitting 96 with the conduit 22. Consequently as should be manifest, a constant fluid connection is provided between the passageway 68 and the vacuum tank 14.

In circularly spaced relation to the left end of the concavity 86 as viewed in Figure 5, the valve rotor 76 has formed therein a through opening 98, and the surface between said concavity and said opening will hereinafter be termed a "working land" and is designated by the numeral 100. A through opening 102 is likewise formed in the valve housing 64 on an imaginary circular correspondingly concentric with that whereon the opening 98 is formed. In the normal or brake-released status of the mechanism portrayed in Figures 1 and 2, the openings 98 and 102 are in registry, wherefore both these reference numerals have been applied in Figure 3, as is understood.

The aforesaid valve rotor 76 and its housing 64 are included in the movable power assembly 56, and said assembly further includes a composite piston designated 104, and a bell-shaped member 106 that terminates at its lower end in a circular flange segment 108 having a periphery preferably corresponding to that of the housing 64. The piston 104 is rigidly clamped between said valve housing and the flange 108 by means of rivets 110 as shown, or otherwise. Thus it should be apparent that the piston assembly 56 and the hydraulic plunger 58 are integrated for unison movement in the vacuum power chamber 112, said piston assembly dividing said chamber into a variable pressure compartment and a constant pressure compartment, said rotary valve 76 being adapted to selectively connect said variable compartment to atmosphere to establish balanced pressures in said compartments for power-inactivation, and to the vacuum tank 14 to produce differential pressures on opposite sides of said piston assembly for power-activation thereof, said constant pressure compartment being maintained at atmospheric pressure via said conduit 24 and air filter device 26.

The plunger 58 is so formed as to define a lower bore 114, and an upper bore 118 concentric thereto but slightly larger in diameter than the bore 114. In consequence of this formation, an abutment shoulder 124 is provided internally of the plunger 58 as shown.

Slidably disposed in said upper bore 118, in a central opening of the valve housing 64, and in a similar concentric opening of the bell member 82, is a pedal-operable plunger 126 that is connected as at 128 to the lower end of a push rod 130, the upper end of said rod having a pivotal connection at 132 with the treadle 38. That portion of said rod 130 projecting into the operator compartment of the vehicle is encompassed by a flexible bellows 134, that is suitably mounted on the cover plate 54 as clearly illustrated in Figures 2 and 8. In the interest of clarity, the plunger 126 will hereinafter be referred as to the "actuating plunger."

Numeral 136 designates a cross-pin that, as more clearly portrayed in Figure 6, is mounted in the actuating plunger 126, and has its laterally projecting ends extending through the spiral slots 84 of the tubular member 80, and into a pair of diametrically opposed longitudinal grooves 138 provided in the inner periphery of the bell member 106. With this arrangement, rotational movement of the plunger 126 is inhibited, whereas axial movement of said plunger to rotate the valve rotor 76 via the pin 136 and slots 84 is afforded, as should be manifest.

Preferably, as illustrated in Figures 2 and 8, the flared cylindrical stop member 62 terminates at its lower end in an outturned circular flange 139. This flange, in the brake-released disposition of the mechanism, serves to limit the upward movement of the piston assembly 56 in response to the biasing forces of a reactive spring to be described, and of the return spring 60. The circular flange 108 of the bell-shaped member 106 has formed therein a plurality of cylindrical apertures 140, and the clamped components of the composite piston 104 have their central body portions removed along an imaginary circle somewhat greater than that defining the periphery of the valve rotor 76 as indicated at 142.

Disposed about a lower extension 147 of the bell member 106 between the valve rotor 76 and the flange 108, is a metallic leaf spring 144 of a generally spider-like configuration, in that it includes a plurality of resilient legs 146 radiating from a central body portion 148 that freely surrounds said extension. The leaf spring 144 is of the compression type, thus insuring intimate contact at all times between the finished face 74 of the valve housing cavity 72 and the confronting surface of the valve rotor 76.

Formed in the lower end portion of the actuating plunger 126 is a socket 150 wherein is seated the spherical upper extremity 152 of what will be termed a pressure reactive plunger or valve rod 154 that is slidable in the lower bore 114 of the hydraulic plunger 58. Numeral 155 designates the lower extremity face of the actuating plunger 126. Preferably, a shallow inverted cup-shaped spring seat 156, resting against the boss portion 66 of the valve housing 64, serves to center the return spring 60 about the plunger 58, whereby smooth reciprocation of the piston assembly 56 in the vacuum chamber 112 is assured.

The hydraulic pressure unit 48 is rigidly supported on the cylinder 50 by means of a plurality of cap bolts 158, each bolt passing through the end wall 52 of said cylinder and an interposed gasket 160 into engagement with a threaded socket provided therefor in the body 162 of said unit.

Generally, the unit 48 is of conventional design. It includes a replenishable hydraulic reservoir 164, and a hydraulic pressure-producing chamber or cylinder 166. Numeral 168 designates a conventional residual two-way check and relief valve mechanism in communication with cylinder 166 via an angular passage 169, whereby fluid under pressure may be transmitted from cylinder 166 to the brake cylinders 36 by way of the conduit 32 and its branches 34 and a minimum non-actuating pressure retained in the hydraulic lines during full brake release. Pressfitted into the upper end of the hydraulic cylinder bore is a hollow bushing 170, that serves to slidably support the free end of the hydraulic plunger 58. The bushing 170 is provided with a circular flanged portion 171 that seats in an annular recess provided in the hydraulic pressure unit body 162, and the plunger 58 has formed therein an external annular groove 172 wherein a suitable oil seal ring is seated, as shown. Ingress of fluid from the cylinder 166 to the vacuum chamber 112 and vice versa is thus prevented. An annular groove and oil seal ring arrangement is also provided for the rod 154, as indicated at 173.

In the brake-released status of the mechanism, the reservoir 164 and the pressure-producing cylinder 166 are in constant communication, whereby the cylinder will be completely filled with brake fluid under a minimum non-actuating pressure at all times, as is understood. To this end, a compensating valve assembly is provided comprising a passageway 174 that extends through the bottom wall 175 of the reservoir and the bushing 170, communicates with an annular groove 176 provided in the external periphery of the reactive plunger, and radial ports 178 lead from said groove to the lower bore 114 of said plunger.

Numeral 180 designates a reduced-diameter extension forming the lower extremity of the pressure reactive valve rod 154, this formation providing an annular shoulder 181 at the juncture of said extension and rod, said shoulder being adapted to close the radial ports 178 when the rod 154 is initially actuated. Since the diameter of this extension is less than the diameter of the bore 114, an annular space is formed therebetween to provide liquid communication between the pressure chamber 166 and compensating valve means 178, 181. Numeral 182 designates a cup-shaped spring seat securely attached to the lower extremity of the extension 180, the seat being adapted to engage the confronting end of the plunger 58 when in normal released position relative to said plunger during brake releasing operations and, as portrayed by the dashed line position of pedal 30 in Figure 2, the compensating ports 178 are partially closed and the rotary valve 76 in closed position venting the vacuum power chamber 112 to atmosphere via ports 98, 102 and air filter device 26.

Disposed in the cylinder 166 between the bottom wall 183 thereof and said spring seat, is a conical coil spring 184 adapted to react on the spring seat in opposition to pedal actuation thereof whereby the seat is brought into engagement with the confronting end of the plunger 58 urging the latter toward its fully released position shown in Figure 1 and by dashed lines in Figure 2, in response to releasing movements of the operator-operated member 30 to thus establish the vacuum and hydraulic units 46, 48 in brake "off" position as shown in Figure 1. The spring 184 is the compression type and characterized by increasing tension progressively induced by the operator member 30 operated from released position wherein the spring assumes a normal pre-energized status to produce a continuous reaction on the operator member via spring seat 182, valve rod 154, actuating plunger 126 and push rod 130, and will hereinafter be referred to as the "reactive spring." The diameter of the lowermost convolution of said spring corresponds to the internal diameter of the cylinder 166, whereas the diameter of the uppermost convolution is such as to seat itself snugly within the spring seat 182. In consequence of this arrangement, the reactive spring 184 is positively centered in the cylinder 166, and normally biases the spring seat 182 into engagement with the free end of the pressure-transmitting plunger 58 when pressure is removed from the pedal 38.

From the foregoing description and an inspection of the drawings, it should be manifest that the reactive spring 184 constantly biases the treadle 38 and parts actuated thereby toward their normal or brake-released positions portrayed in Figure 1 and Figure 2 (dashed lines).

Modified compensating valve structure

Attention is now directed to Figure 10 in which all elements which have been previously described, are identified by like reference numerals distinguished, however, by the addition of the letter "a" to each. This view discloses a modified arrangement whereby fluid communication between the fluid reservoir 164a and the hydraulic pressure-producing cylinder 166a is controllable by a compensating valve generally indicated at 190, a spring seat 192 rigidly secured to the lower end of the valve rod 154a, and a leaf spring 194. The bushing 170a is abbreviated as shown, and in brake-released status, the valve rod 154a extends to the bottom of the bore 114a where the seat 192 is riveted or otherwise secured thereto. The bottom wall 175a of the reservoir 164a is raised to provide a superjacent compartment 196 wherein the valve 190 is pivotally mounted as at 198. Surrounding the lower terminus of the passage 174a, which in this arrangement extends only through the bottom wall 175a of the reservoir, is a depending fixed valve seat 200. The valve 190 is of substantially L-shaped configuration, and rigidly secured as by a rivet 202 to the long leg 204 of the valve, is a circular rubber pad 205 or the like which cooperates with seat 200.

The spring seat 192 is cup-shaped, the peripheral wall 206 thereof being angularly disposed or flared, as illustrated. The leaf spring 194 is of resilient material. It includes a confined segment embedded in a longitudinal undercut slot 210 provided in the bushing 170a, and a free segment 212. The segment 212 engages against the short leg 214 of the valve member 190, thus biasing the pad 205 toward seat 200 to close the passage 174a.

Numeral 216 designates a conical reaction spring disposed between the bottom wall of the cylinder 166a and the said spring seat 192, the latter normally engaging the free end of the pressure-transmitting plunger 58 whereby the force exerted by this spring is rendered effective to return the power-piston assembly 56 to released position depicted in Figure 10.

Operation

In the Figure 2 brake-released status of the booster mechanism 20 with the pedal 38 slightly depressed from its fully released position shown in Figure 1 wherein the movable spring seat 182 is normally engaged with the free end of the pressure-transmitting member 58 and the power-piston assembly 56 is reset to released position under influence of the reactive and return springs 184, 60 respectively, the spring seat 182 has been operated relatively to said member 58 out of engagement with its free end in opposition to reaction from the reactive spring 184 while the piston return spring 60 yieldably holds the power-piston assembly 56 against the abutment flange 139 of the stop member 62 in brake-released position. In the preferred embodiment of the invention illustrated, the biasing force of the spring 184 is augmented by that of the return spring 60, but it is to be noted that said return spring may be dispensed with, inasmuch as the reactive spring 184 per se may be provided with sufficient force for the purpose. Atmospheric pressure is present in both compartments of the vacuum chamber 112 on opposite sides of the piston 104 via the device 26, conduit 24, openings 140, the internal circular recess 142, and the aligned passages 98 and 102.

The valve rotor 76 is at this time disposed in what will be termed a neutral off position, wherein the opening 88 communicates with the arcuate recess 86 of the valve housing 64, as best portrayed in Figure 3. Suction emanating from the vacuum tank 14 via conduit 22 aids the leaf spring 144 in maintaining an intimate contact relation between the smooth undersurface of the valve rotor 76 and the similar confronting surface 74 of valve housing 64. With this arrangement, vacuum in the chamber 112 itself is non-existent, as should be apparent.

The hydraulic pressure-producing cylinder 166 as well as the piping 32—34 are filled with brake fluid inasmuch as the reservoir passageway 174 communicates with the plunger groove 176, and the annular shoulder 181 of the valve plunger rod 154 is disposed to the right of the radial ports 178. The reactive spring 184 serves to establish the valve rod in this position, and simultaneously, as should be evident, serves to also establish the piston assembly 56 against the circular stop member flange 139, and to support the brake pedal 38 in fully released or idle status as demonstrated in Figure 1. As a result of this arrangement, reaction or what is termed "driver feel" is always in evidence at the touch of said pedal, irrespective of the degree of pedal depression. The return spring 60, as hereinbefore noted, serves to center the piston assembly, and also aids the spring 184 in retracting and establishing said piston assembly firmly against the stop member flange 139.

The spring 184 has been termed a reactive spring, for the reason that it functions independently of the return spring 60 in the transmission of "driver feel" to the pedal. To this end, the reactive spring is initially installed in the master cylinder 166 in a slightly pre-compressed condition, wherefore reaction at the pedal is evident at the slightest touch thereof. Consequently, whenever the pedal is incrementally depressed in the course of a brake-applying operation, reaction evidence at the pedal increases, and conversely, whenever the pedal is incrementally released following a depression thereof, reaction evidence at the pedal decreases.

In other words, and as the drawings demonstrate, there is no lost-motion movement of the pedal at any time. The reactive valve rod 154 and its extension 180, the socket connection 150—152 between said valve rod and the lower end of the actuating plunger 126, the connection 128 between the upper end of said plunger and the lower end of the pedal rod 130, and the connection 132 between the upper end of said rod and the pedal 38, provide an organization of elements disposed between the pedal and the spring seat 182 for unison movement. Thus reaction of spring 184 on the pedal is constant and increases throughout the full operating stroke of the movable power assembly 56, inasmuch as each incremental depression of the pedal positively further compresses the spring 184; and upon closure of the compensating valve 178, 181 (see Figures 2 and 8) or modified form thereof (see Figure 10), the fluid pressure force in the hydraulic lines to the wheel cylinders 36 is transmitted proportionally to the driver's foot via pedal 38 according to the cross-sectional area of valve rod 154, to supplement the reacting force produced by spring 184, as should be understood.

Assuming now that with the engine in operation it is desirable to apply the brakes, the operator will actuate the pedal 38 with his foot in normal fashion. Initially, pedal depression will cause the transverse pin 136 to descend in the spirally generated slots 84, thus rotating the valve rotor 76 a slight distance in a clockwise direction from the viewpoint of the operator. In consequence, the arcuate concavity 86 also moves clockwise a corresponding distance, whereby the working land 100 covers the opening 102 in valve housing 64, thus segregating from communication with atmosphere the variable compartment of vacuum chamber 112 to the left of the piston 104.

Slight further pedal depression will effect a corresponding further rotation of the valve rotor, thus bringing one end of the arcuate concavity 86 into registry with valve housing opening 102. Consequently, the variable pressure compartment aforesaid of chamber 112 to the left of the piston 104 is placed in communication with the vacuum source 14 via said opening 102, concavity 86, radial passageway 68, angularly drilled passageway 90, fitting 94, flexible hose 92, fitting 96, and conduit 22.

Assuming now that during the momentary time lag required to fully energize the piston 104 slight further pedal depression has taken place, the status of the mechanism will be as demonstrated in Figure 8. That is to say, Figure 8 depicts the mechanism at the precise instant that the differential pressures are about to effect leftward movement of the piston assembly 56 independently of any personal effort by the driver. Immediately after the illustrated disposition of the mechanism has been attained, the piston assembly will automatically move leftward in consequence of the pressure differential then set across opposite sides of the piston 104, as is well understood. Figure 9 further demonstrates that in the course of the thus far described pedal depression operation, the lower portion of the valve rod 154 has covered the radial ports 178, thus segragating the brake fluid in cylinder 166 from that in the reservoir 164 to enable the fluid in the cylinder and connected hydraulic brake system to become pressurized.

As the vacuum-actuated piston assembly 56 now moves leftward, hydraulic pressure will be increasingly applied via passageway 169, valve 168, line 32, and its branches 34 to the wheel cylinders 36, in consequence of volumetric displacement, by the lower end portion of the primary plunger 58 and valve rod 154, of fluid in the chamber of cylinder 166, as should be manifest. It should also be apparent, that as the plunger 58 is incrementally advanced, the reaction spring 184 is incrementally compressed further. As a result, successive reactions are transmitted to the foot of the driver, these reactions corresponding in intensities to the brake-applying force.

From the foregoing, it should be evident that the present invention provides an improved pedal-controllable hydraulic power brake mechanism including novel means, adapted responsive to incremental pedal depressions, to first segregate the variable pressure compartment of the vacuum chamber 112 from atmosphere, to thereupon establish fluid communication between the segregated portion of the chamber and a source of vacuum, and to thereafter by a combination of evacuation, atmospheric pressure and pedal actuation, to increase and decrease the hydraulic pressure of brake application at the discretion of the operator.

Attention is directed to the arcuate concavity 86 and the working land 100 provided in the valve rotor 76. This arrangement enables the operator to establish a "brake-holding" status at any brake-engaged position of the mechanism. Thus, should the operator decide at any point within the range of pedal movements to "hold" the brakes on momentarily at the then prevailing status, stoppage of movement of pedal 38 would result in slight additional advancement of the power piston 104 thereby causing a slight counterclockwise rotation of the valve rotor. As a result, the concavity 86 would be withdrawn from registry with the opening 102, to where the working land 100 would overlie said opening. In this disposition of the valve rotor, the vacuum force would be temporarily interrupted, wherefore the status quo of pressure differential application would simultaneously be temporarily maintained in substantial counterbalance with the pressure in the wheel lines, as should be understood.

With particular reference once more to Figure 8, it is noted that the invention further provides means for direct application of the brakes by foot pressure, in the event of partial or complete power failure. Thus it is observed that at the instant the leftward movement of the vacuum-energized piston assembly 56 is initiated, the actuating plunger 126 lower extremity face 155 is closely spaced from or may actually contact the annular internal shoulder 124 of the hydraulic plunger 58, the latter condition being shown in Figure 8. In the event the vacuum power should not function at this point, an awareness thereof would be "telegraphed" to the operator's foot, wherefore so to speak, he would instinctively employ his personal power to consummate the braking operation. It is further noted that the provision of the arrangement described in the immediately preceding paragraph also enables the operator to apply his foot pressure immediately in the event of an emergency; also after the full power-generated braking action has been utilized or what is termed power-run-out.

It is here once more emphasized that throughout the range of possible pedal movements, the reactive spring 184 plays a most important role because in the final analysis, it is this spring that automatically provides for the driver a constant perception of what is currently taking place in the braking system of the vehicle he is steering. However, after the compensating valve aforesaid is closed by initial actuation of the valve rod 154 in unison with the power control valve 76 to control the vacuum power unit to be operatively energized, a supplemental proportional fluid-pressure reactive force is produced across the end of the valve rod exposed to the fluid pressure conditions created in the working chamber 166 by joint projection of the primary plunger 58 and reactive rod 154 into said chamber from fully released status thereof as shown in Figures 2 and 10. These combined reactive forces on the pedal 38 produced by the spring 184 and pressure reaction on the end of the valve rod 154 enable the establishment of an accurately calibrated reactive force correlated with the overall braking force required for the particular type of vehicle equipped with the present invention.

It is important to note here that the magnitude of the reduced hydraulic reaction on the treadle 38 exerted by the pressurized braking fluid on the end of the reactive piston rod 154 can be varied in accordance with the diameter of such element. However, this reduced reactive force will always be proportional to the force with which the brakes shoes are frictionally applied to the vehicle brake drums, to provide the operator with accurate sensing of the amount of braking force being applied. This hydraulic reaction principle is in sharp contrast to the control characteristic provided by the spring 184 against which the control valve actuating plunger 126 is adjusted to rotate the valve rotor 76 thereby controlling operative energization of the vacuum-motor 46 since resistance to depression of the pedal 38 increases in direct proportion to the distance it is depressed rather than pressure conditions to which the piston rod 154 is subjected. Therefore, such spring resistance alone would not necessarily have a magnitude correlated with the amount of braking force in effect for every position of the brake-pedal with the added disadvantage of pedal-load increasing to an undesirable degree toward the end of the full operating stroke of the power-piston assembly 56. As spring 184 is additionally compressed above its normal preloaded status shown in Figure 2, to the position of Figure 8, it provides increasing resistance to pedal movement up to the point of the brake fluid becoming pressurized, and thereafter, resistance becomes substantially constant as a consequence of the substantially stationary condition assumed by the fluid-displacing parts such as the plunger 58 resulting from the non-compressible column of brake fluid.

Accordingly, the reactive forces from the spring 184 and rod 154 are teamed together with the rod supplying the major portion of these combined diminutive reactions as a measure of the amount of braking force in effect at any given position of the treadle mechanism 30 at which the fluid is pressurized along its full operating stroke while the reactive spring force becomes substantially constant at the point the fluid reaches such a pressurized state. Spring 184 also combines with the vacuum-motor piston return spring 60, to return the control valve parts and motor piston 56 to their respective released positions shown in Figure 2, yet spring 184 does not hinder movement of the piston assembly 56 in a pressure-producing direction since this spring is operated ahead out of engagement with the plunger 58 in response to operator effort applied to the treadle 38 while the motor is energized.

Reduction of this spring reaction principle to commercial usage, has demonstrated that the preloaded weight should be approximately 20# and rated at maximum compression corresponding to the end of the full operating stroke of the plunger 58, at 60# pressure which, when transmitted through the pedal linkage 30, reacts at proportionally reduced pressures in accordance with the leverage ratio of the pedal linkage. This reaction from the spring 184 is effective to a limited extent defined by the distance the pedal is moved to a point at which the brake fluid becomes pressurized under influence of the vacuum-motor 50. Therefore, this spring serves to best advantage as a reacting means by utilizing its yielding resistance through substantially the first-half of the series of pressurizing movements along the full operating stroke of the plunger 58 which may be had by keeping the brakes properly adjusted and the system free of leaks which service operations contribute to safer driving. At pressurizing points beyond the halfway mark aforesaid of the plunger 58, reaction from spring 184 rated as indicated above would tend to build up rapidly to such an extent as would produce a moderately "hard-pedal" which would defeat the objective of reduced pedal effort.

Further considering the functional inter-relation of the two springs 60 and 184, it is desired to point out that these springs are capable of cooperating to return the movable power assembly to full brake "off" position as portrayed in Figures 1 (solid lines) and 2 (dashed lines); but when the brakes are "on" due to pedal depression, spring 184 reacts only on the pedal thus offering no resistance to energized movement of the power assembly 56, while spring 60 is constantly opposing movement of said assembly from its normal fully retracted position aforesaid. Moreover, these two springs have an independent status, that is, the spring 60 may be dispensed with without impairing the operativeness of the present invention, since spring 184 alone is capable of the dual functions of reacting on the pedal 38 and also biasing the movable power assembly and its control valve element 76 to take the brakes "off" as the pedal is progressively released to the position of Figure 2.

The novel adaptation of spring 184 for controlling the compensating valve between the fluid reservoir and pressure producing chamber 166, provides an important third function of this spring whereby said valve is constantly biased toward open position which becomes effective to accommodate fluid flow between the reservoir and chamber when the full brake "off" position is established as shown in Figure 2.

The modified valve construction shown in Figure 10 for controlling fluid communication between the replenishable fluid reservoir 164a, and the pressure-producing chamber of the hydraulic cylinder 166a, provides an ideal substitute for the annular groove 176a, radial ports 178a and reduced diameter extension 180a arrangement exhibited in Figures 2 and 8. It is not believed necessary to encumber this specification with additional detailed treatment of this valve construction, inasmuch as an adequate description thereof has been given hereinbefore, and Figure 10 visibly exhibits the included elements and their operative relationship. The reactive spring 216 is a counterpart of the spring 184, and operates in identical fashion to transmit "brake control feel" to the driver.

*Operational summary*

From the foregoing description augmented by an inspection of the drawings which illustrate two embodiments of the invention, it will be seen that certain interrelated components of the power-assisted mechanism 20 possess similar functional characteristics such that interchangeability is readily effected, particularly in connection with the power controlling features and type of pressure-transmitting member 58 employed in the master cylinder 166 for developing pressure on the liquid confined therein. This member may be a piston of the same cross-sectional area as the diameter of the cylinder, or a plunger of less cross-sectional area which would eliminate machining the interior of the cylinder but a longer working stroke would be necessary to effect a corresponding displacement of liquid for a given stroke of the piston. For example, in the case of the power controlling features, a flexible power diaphragm may be substituted for the illustrated piston-type power assembly 56 and either of which may be controlled with substantially equal efficiency by the disclosed rotary-type valve 76 or more broadly in a patent sense by a movable valve element.

It is important here to place additional emphasis on the novel advantages provided by the spring 184 which is installed in pre-energized condition within the hydraulic cylinder 166 with one end thereof bearing on the end wall 183 and the other end reacting on the movable seat 182 rigid with the end of the pedal-actuated reactive member 154 exposed to pressure conditions within the chamber 166. This reactive and valve member is provided with the shoulder 181 formed at the point of mergence of the normal diameter portion and the reduced diameter portion forming the terminus which includes the movable spring seat 182. This shoulder is normally spaced to the right of radial ports 178 which in turn communicate with the bore 114 and annular channel 176, the former communicating with the chamber 166 and the latter connected to the compensating port 174 when the mechanism 20 is in brake "off" position. In this manner, the compensating port 174 is placed in communication with the chamber 166 so that excess liquid in the hydraulic system may return to the reservoir or additional liquid from the reservoir may be supplied to compensate for any losses from the system as is understood. When the pedal 38 is initially depressed, spring 184 provides instant resistance to prevent any tendency on the part of the operator to overbrake, and as shoulder 181 closes the radial ports 178 the pressure producing chamber 166 becomes conditioned to displace liquid under pressure via discharge port 169 and residual pressure valve 168. During this sequence of operations induced by initial pedal depression from the dashed line to the solid line position thereof depicted in Figure 2, the power control valve 76 opens following closure of the compensating port 174, to cause operative energization of the power member 56 thus providing power assistance to displace liquid under pressure through the discharge port 169 and associated valve 168 into the wheel cylinders of the vehicle to apply the brakes. The concurrently effective pressure buildup within the chamber 166 during a brake-applying operation reacts proportionally on the exposed end of the reactive rod 154 supplemented by the force exerted by the spring 184 on the pedal 38. It should be especially noted that the pressure buildup of the spring 184 from its preloaded status is proportional substantially to any given position of the pressure-transmitting plunger 58 along its full operating stroke. Therefore, for a given pressure condition within the chamber 166, the spring 184 reflects a corresponding reactive force on the pedal 38, said spring being effective in a brake-applying direction of the mechanism 20 to oppose actuation of the control valve 76 by the pedal and provide said reaction on the pedal, while in a brake-releasing direction it serves to return the pedal and valve element 76 to fully retracted status and also acts via the spring seat 182 and confronting end of the plunger 58 when engaged to return the movable power assembly 56 to brake released position, thus the force exerted by the spring 184 is ineffective on the power assembly 56 during power assistance thereby so that maximum power is available to assist in applying the brakes.

Return spring 60 may be regarded as a stabilizing means for the movable power piston 56 and in practical application need not exceed 5-7# preload. This spring can be dispensed with without impairing the operativeness of the booster unit 20 since spring 184 has the function of acting to return the power assembly 56 to brake "off" position when pressure is removed from the pedal 38. Accordingly, spring 60 may be termed an auxiliary return spring.

Further beneficial results in braking control of a motor vehicle equipped with the present invention may be realized in the selective use of the two types of compensating valve assemblies shown at 181 (Figure 2) and 190 (Figure 10), the latter utilizing valve control separate from the reactive plunger 154a but operated thereby to simplify sealing off the pressure chamber 166a from the vacuum power chamber 112a as well as the chamber 166a from the reservoir 164a.

Considering the terminology used in the foregoing description and in the appended claims, the identifying expressions and/or terms employed are intended to convey meanings which include the range of reasonable equivalents in the patent sense. For example, the expressions "servomotor," "power-piston assembly," "power mechanism," "power means," "power device," "power cylinder" are intended to include any casing and/or chamber having a pressure-responsive movable assembly therein, whether such assembly includes a solid piston, or a flexible diaphragm, or some other member serving the same purpose. The terms "front," "rear," "right," "left," and other directional words or characters are intended to have only relative connotation for convenience in describing the structure as illustrated, and are not intended to be interpreted as requiring any particular orientation with respect to associated structure external to the present disclosure.

Although I have illustrated and described two embodiments of my invention, I do not wish to limit such to the exact construction or arrangement of parts shown, since it is evident that modifications and substitutions may be made therein without departing from the proper scope or fair meaning of the subjoined claims.

I claim as my invention:

1. In a brake booster system for fluid column operated brakes: a master cylinder having a fluid reservoir, fluid-displacing means including an axially bored working member advanceable in such master cylinder to compress such column of fluid to a brake-applying pressure, a pressure differential actuated booster motor comprising a two-compartment power cylinder defined by a power member movable therein to advance said working member with consequent variation in the size of said compartments in which pressures are balanced when said power member is normally in released position, a source of pressure different from atmosphere to produce said pressure differences in said compartments to move said power member; control valve means including a rotary element for controlling said source to produce pressure differential in said compartments, said valve element having a normal "off" position and an operating "on" position; operating mechanism for imparting rotational movement to said valve element, an operator-operated member having a normal released position for actuating said operating mechanism; a pair of spaced ports through the power member normally providing communication via said valve element between said two compartments to balance pressures therein, and between said source and valve element respectively, said valve element being effective to selectively connect the port leading from said source to one of the compartments to vary the pressure therein and the other port to both of said compartments to effect said balanced pressures therein; a normally preloaded spring between the power member and valve element cooperating with differential pressures when effective to maintain an air-tight seal therebetween; a plunger slidably disposed in the axial bore of said working member in coaxial engagement with said operating mechanism with its free end projecting to where it constantly receives hydraulic reaction from said master cylinder when fluid therein is compressed; complemental abutting means operably disposed between said operator member and working member for predetermining the relative rotative movement of said valve element, said abutting means being effective when said relative movement is taken up to transmit force exerted by the operator on said operating mechanism directly to said working member in the event of failure of said source of pressure; liquid passageway means normally open between the reservoir and master cylinder; and another normally preloaded spring operably disposed in said master cylinder and effective to reset the plunger, operating mechanism, valve element, working and power members to their respective normally released positions when force is removed from the operator member.

2. A brake booster system according to claim 1 in which said control valve means comprise: a working surface on said power member communicating with said pair of ports, a complemental working surface on the valve element in intimate air-tight sealed engaging relation with the working surface on the power member, a vacuum chamber in the working surface of said valve element in constant communication with the port leading to said source of pressure, an opening through said valve element normally communicating with said other port to balance pressures in the two compartments aforesaid, a working land disposed between said vacuum chamber and opening for selectively connecting the vacuum chamber aforesaid to said other port to vary the pressure in said one compartment and, said opening to said other port to establish equivalent pressures in said compartments, said differential pressures on opposite sides of the valve element overlying said vacuum chamber when the booster motor is energized being effective to cooperate with the spring reacting on the valve element to maintain sealed relation between said working surfaces.

3. A booster brake system according to claim 2 in which said operating mechanism comprise: an actuatable element having relative axial movement with respect to said power member under influence of said operator member, and a portion on said actuatable element cooperates with an angular working surface on said valve element for simultaneously converting the axial movement of said actuatable element into rotary movement of said valve element within the limits of said predetermined rotative movement thereof.

4. A brake booster system according to claim 3 in which said abutting means comprise: a pair of normally spaced portions carried respectively by said actuatable element and working member in confronting relation, and which are engageable when said valve rotative movement is taken up for directly actuating said working member in cooperation with or independently of power assistance from said power member.

5. A booster brake system according to claim 1 in which the liquid passageway means comprise: a normally open port through the wall of that portion of the working member projecting into the master cylinder, a liquid passage for interconnecting the reservoir and master cylinder via said normally open port, and a cooperating portion on the plunger for closing said port to isolate the reservoir liquid from that in the master cylinder in response to initial relative movement of said plunger with respect to the working member in a brake-applying direction.

6. A booster brake system according to claim 1 in which the liquid passageway means comprise: a liquid passage normally open between the reservoir and master cylinder, a valve seat terminating that end of said passage leading to the master cylinder, a compensating valve element movably mounted on the master cylinder and cooperating with said valve seat to open and close said passage, a normally preloaded spring having one end bearing on the master cylinder and the other end reacting on the compensating valve element to urge the latter into seated relation with its cooperating seat to close said passage, and a projection on that portion of the plunger projecting into said master cylinder for engaging said compensating valve element to establish it in open position in opposition to its closing spring in response to relative movement of the plunger with respect to said working member, in a brake-releasing direction.

7. A brake booster mechanism of the type described, comprising: a vacuum-power cylinder including a vacuum-power chamber selectively connectible to a source of vacuum production and to atmosphere, and a hydraulic cylinder having a reservoir, pressuring working chamber and a discharge port therefor; a pneumatically-actuated piston and an axially bored plunger assembly reciprocably mounted in the power cylinder, and having a normal released position to one side of said power chamber with a portion of said plunger projectable into said working chamber; a normally preloaded spring operably disposed in said power cylinder for urging said power member toward its released position; an air-vacuum control valve assembly including a rotatable element mounted on said piston for controlling the piston-plunger assembly; another plunger slidably disposed in the axial bore of said first-named plunger with one end exposed to hydraulic reaction from said working chamber; an operator-operated member having a normal released position; operating mechanism disposed between said operator member and valve element and including an actuatable element coaxially engaged with the other end of said last-named plunger and interconnected with said valve element by a cooperating pin and spiral slot for imparting rotary movement to said valve element in response to axial movement of said actuatable element acted on by said operator member; abutting means included in said operating mechanism for limiting the rotary movement of said valve element and engageable with said working member to operate the same at the end of said valve rotary movement; liquid passageway means including a port in that portion of said first-named plunger normally open between the hydraulic reservoir and working chamber when the piston-plunger assembly is in released position; means on that portion of the second-named plunger exposed to hydraulic reaction for closing said port in response to initial relative actuation of said second-named plunger with respect to said first-named plunger; a fixed abutment on the hydraulic cylinder; a movable spring seat carried on the end of the second-named plunger exposed to hydraulic reaction, and normally engaging the end of the portion of said first-named plunger projectable into said working chamber; a normally preloaded compression spring operably disposed in said working chamber between said fixed abutment and movable seat for opposing operator member actuation of said operating mechanism, said last-named spring being characterized by increasing reaction progressively induced by said operator member operated from released position to produce supplemental reaction to said hydraulic reaction across the end of the second-named plunger exposed to said working chamber when the power cylinder is activated.

8. A brake booster mechanism of the type described, comprising: an operator-operated pedal having a normal released position, a power cylinder having an end wall, a master cylinder having a reservoir mounted on said end wall, a pressure-producing chamber in said master cylinder and having a portion of an axially bored liquid-displacing member projecting therein, a discharge port for said chamber; a fluid-pressure responsive movable assembly in the power cylinder for acting on said liquid-displacing member, and having a normal released position; a source of fluid pressure different from atmosphere to activate said movable assembly; a normally preloaded spring operably disposed between said end wall and movable assembly to reset the latter in released position; a stop member fixed to the power cylinder for establishing the movable assembly in its released position; a port normally open to the said reservoir and working chamber; power control means having a normal released position including a spring-loaded rotary-type valve mounted on said movable assembly in coaxial disposition with respect thereto for controlling activation and inactivation thereof; an actuatable member; a plunger slidably disposed in the axial bore of said liquid-displacing member with one end exposed to hydraulic reaction from said pressure-producing chamber and the other end thereof in coaxially engaging relation with one end of said actuatable member for movement together; operating mechanism disposed between said actuatable member and valve for imparting limited rotary movement to the latter in response to axial movement of said actuatable member induced by said pedal operated from its released position; a pair of complemental abutting elements disposed between said actuatable member and movable assembly in normally spaced confronting relation to define said limited rotary movement of said valve; stop means for establishing the relative released position of said plunger and actuatable member with respect to said movable assembly; a vacuum-atmospheric port in said movable assembly; a vacuum port in said movable assembly connected to said source; an atmospheric port in said valve normally communicating with the vacuum-atmospheric port; a vacuum chamber circumferentially spaced from the atmospheric port in the valve, and constantly connected to the vacuum port; a working land on the valve between said vacuum chamber and port in the valve for selectively connecting the vacuum chamber to the vacuum-atmospheric port in the movable assembly and the latter port to the port in said valve; a compensating port through the wall of the portion of the liquid-displacing member projecting into said pressure producing chamber controlled to its closed condition by a portion on the end of said plunger exposed to hydraulic reaction via said first-mentioned port to connect said reservoir and pressure-working chamber when the liquid-displacing member and plunger are in their relative released positions, said plunger being effective to close said compensating port to isolate the reservoir liquid from that in the pressure-working chamber in response to initial relative movement of said plunger with respect to said liquid-displacing member, said first-mentioned port being closed in response to relative initial movement of said liquid-displacing member notwithstanding subsequent reciprocable movements of said plunger would effect intermittently open and closed conditions of said compensating port.

9. A hydraulic pressure-producing mechanism, in which physical operating force is supplemented by power assistance, comprising: a power cylinder; a master cylinder having a liquid reservoir, a discharge port in the master cylinder; a fluid-pressure responsive wall movably mounted in the power cylinder to provide a variable power chamber therein to one side of said movable wall; a working member acted on by said movable wall and having a liquid-displacing portion operably projecting into the master cylinder; control valve means including a rotary element having a working surface in continuous intimate engagement with a complemental working surface on said movable wall under influence of combined fluid and spring pressures to maintain air-tight sealed relation therebetween, said valve element having a normal "off" position wherein said movable wall is inactivated and an operating "on" position wherein said movable wall is activated; a normally preloaded spring operably incorporated between the movable wall and valve element to exert continuous pressure on the latter; a source of pressure different from atmosphere connected to said rotary valve element; liquid passageway means normally open between the master cylinder and reservoir; means on the portion of the working member projecting into said master cylinder for closing said passageway means to isolate said reservoir from the master cylinder upon initial movement of said working member to pressurize the liquid in said master cylinder; an operator-operated member for controlling said valve element to its "on" and "off" positions of control; reaction means for transmitting reduced pressure reactive forces to said operator member; and another normally preloaded spring reacting on said valve element to reset it to its "off" position when force on the operator member is removed.

References Cited in the file of this patent
UNITED STATES PATENTS

| | | |
|---|---|---|
| 2,006,487 | Sorensen | July 2, 1935 |
| 2,165,942 | Rossmann | July 11, 1939 |
| 2,275,697 | Stelzer | Mar. 10, 1942 |
| 2,407,856 | Stelzer | Sept. 17, 1946 |
| 2,448,981 | Ingres | Sept. 7, 1948 |
| 2,458,803 | Stelzer | Jan. 11, 1949 |
| 2,532,960 | Stelzer | Dec. 5, 1950 |
| 2,644,305 | Price et al. | July 7, 1953 |
| 2,670,604 | Edge | Mar. 2, 1954 |
| 2,685,171 | Price | Aug. 3, 1954 |
| 2,685,172 | Price | Aug. 3, 1954 |
| 2,770,949 | Randol | Nov. 20, 1956 |